United States Patent [19]

Merkle et al.

[11] 4,102,273
[45] Jul. 25, 1978

[54] APPARATUS FOR POSITIONING BATTERY-OPERATED ROAD VEHICLES AT BATTERY REPLACEMENT STATIONS

[75] Inventors: Theodor Merkle, Itzelberg; Paul Meyer, Heidenheim, both of Fed. Rep. of Germany

[73] Assignee: J. M. Voith GmbH, Heidenheim, Fed. Rep. of Germany

[21] Appl. No.: 747,946

[22] Filed: Dec. 6, 1976

[30] Foreign Application Priority Data

Dec. 24, 1975 [DE] Fed. Rep. of Germany ....... 2558637

[51] Int. Cl.² .............................. B60K 1/04; B60S 5/00
[52] U.S. Cl. ...................................... 104/34; 104/48; 105/50; 214/38 BB
[58] Field of Search ................. 104/34, 48, 49, 50; 105/50, 51; 214/38 B, 38 BB

[56] References Cited

U.S. PATENT DOCUMENTS

| 635,300 | 10/1899 | Condict | 104/34 |
| 2,428,856 | 10/1947 | Sinclair | 104/50 |
| 2,924,389 | 2/1960 | Anderson | 214/38 BB |
| 3,680,718 | 8/1972 | Miyachi | 104/50 |

FOREIGN PATENT DOCUMENTS

| 174,553 | 9/1952 | Austria | 104/48 |
| 1,144,399 | 10/1957 | France | 214/38 BB |
| 2,236,215 | 5/1973 | Fed. Rep. of Germany | 104/34 |
| 2,214,647 | 9/1973 | Fed. Rep. of Germany | 104/34 |
| 2,422,960 | 11/1975 | Fed. Rep. of Germany | 104/34 |

Primary Examiner—Robert G. Sheridan
Assistant Examiner—Carl Rowold
Attorney, Agent, or Firm—Peter K. Kontler

[57] ABSTRACT

Apparatus for positioning battery-operated road vehicles at relay stations where exhausted batteries are replaced with recharged batteries and wherein automatic or semiautomatic equipment is used for removal and/or introduction of batteries has a horizontal platform for the rear wheels and two sockets for the front wheels of a vehicle. The sockets are provided in a slide which is movable to and fro in parallelism with the front axle of the vehicle and is mounted in a carriage which is movable back and forth along the ground in the longitudinal direction of the vehicle. The carriage and the slide are movable by discrete motors to respectively move the vehicle lengthwise and about a vertical axis to an optimum position relative to a dolly or lift for delivery of recharged batteries or removal of exhausted batteries.

9 Claims, 2 Drawing Figures

APPARATUS FOR POSITIONING BATTERY-OPERATED ROAD VEHICLES AT BATTERY REPLACEMENT STATIONS

BACKGROUND OF THE INVENTION

The present invention relates to the field of electric road vehicles in general, and more particularly to improvements in apparatus at battery replacement or relay stations where spent energy sources (hereinafter called batteries or motive-power batteries) of such vehicles are replaced with fresh (recharged) batteries.

It is already known to utilize a trolley, dolly or another suitable conveyance for transport of spent and fresh batteries at relay stations where spent motive-power batteries are removed from and fresh batteries are inserted into or otherwise secured to road vehicles. Reference may be had to German Offenlegungsschrift No. 2,214,647. Motive-power batteries are often rather heavy and bulky so that the use of a conveyance contributes significantly to convenience of replacement of spent batteries as well as to a reduction of the interval of halt of battery-operated road vehicles at relay stations. The aforementioned German publication discloses a conveyance which can receive a spent battery and facilitates the transfer of a fresh battery into or onto the road vehicle provided that the vehicle is moved to a predetermined position with respect to the conveyance. As a rule, the positioning means for vehicles includes a recess or socket in the floor or ground at the relay station, and the driver of the vehicle must manipulate the vehicle with great care in order to insure that a wheel will actually enter the socket, i.e., that the spent battery will be readily accessible for transfer onto the conveyance. Proper positioning involves placing a side of the vehicle into accurate register with the conveyance (or with the path for the conveyance) as well as accurate orientation of the vehicle with respect to a vertical axis. Such orientation can present serious problems, especially if the driver is inexperienced. In fact, even a highly skilled operator is likely to spend a relatively long period of time in order to properly orient the vehicle with respect to the conveyance. As a rule, proper orientation involves moving the vehicle to a position which deviates only negligibly from an optimum position; in most instances, the deviation cannot exceed one or more centimeters, not only as considered in the longitudinal direction of the vehicle but also as regards its orientation with respect to a vertical axis.

The provision of a socket in the floor or ground at the relay station for battery-operated road vehicles is satisfactory only when the position of the battery with respect to the wheel which enters the depression is identical for each battery-operated vehicle. However, such socket will not insure satisfactory positioning of different types of vehicles wherein the batteries are located at different distances from the front and/or rear wheels and/or at different levels. For example, certain battery-operated vehicles have battery compartments which can be reached from below (i.e., at the underside of the chassis), and certain other types of vehicles have battery compartments which are accessible at the one or the other side of the chassis. Moreover, the provision of a single socket does not insure that the inclination of the chassis (i.e., of the battery compartment which is normally provided in the chassis) will correspond to an optimum inclination, especially if the removal of spent batteries and the insertion of fresh batteries is to be carried out semiautomatically or in a fully automatic way.

OBJECTS AND SUMMARY OF THE INVENTION

An object of the invention is to provide a novel and improved apparatus which insures accurate positioning of battery-operated road vehicles at a relay station regardless of the size, type and/or condition of vehicles, which can insure satisfactory positioning of vehicles in more than one respect, and which is not only simple but also sufficiently versatile to allow for automatic or semiautomatic exchange of batteries in trucks, passenger cars or other types of road vehicles.

Another object of the invention is to provide an apparatus of the just outlined character which can move a road vehicle to an optimum position for evacuation of a spent battery and/or insertion of a fresh battery even if the driver of the vehicle lacks the necessary skill to move the vehicle to or even into close proximity of an optimum position.

A further object of the invention is to provide an apparatus which can move a vehicle to optimum position for replacement of spent battery regardless of whether the position which the vehicle assumes under its own power deviates from an optimum position in a direction as considered lengthwise of the vehicle and/or with respect to a vertical axis.

An ancillary object of the invention is to provide the apparatus with novel and improved means for changing the position of the vehicle as considered in the longitudinal direction thereof.

A further object of the invention is to provide the apparatus with novel and improved means for changing the orientation of vehicles with respect to a vertical plane.

An additional object of the invention is to provide the apparatus with novel and improved means which insures an optimum inclination of the chassis during removal or insertion of batteries.

A further object of the invention is to provide an apparatus which can facilitate insertion and removal of batteries from different types of vehicles including vehicles wherein the battery compartment is accessible from below, from the rear or from one side of the chassis, as well as vehicles having front and rear axles located at different distances from each other and/or having different tracks.

Another object of the invention is to provide an apparatus whose manipulation necessitates relatively little skill.

The improved apparatus comprises a threshold structure which can be traversed by the wheels of a battery-operated vehicle and includes a ground- or floor-contacting first carriage movable (preferably along tracks) back and forth in a first direction, and a second carriage or slide which is preferably recessed into the first carriage and is movable therein back and forth in a second direction substantially at right angles to the first direction. The second carriage has one or more recesses or sockets for reception of one or more wheels of a set of aligned wheels on a battery-operated vehicle which is driven onto the threshold structure in the general direction of movement of the first carriage. The first carriage preferably comprises a channel or an analogous means for confining or restricting the second carriage to movement in the second direction.

The apparatus preferably further comprises an electric motor or another suitable prime mover for driving the first carriage in the first direction. Such motor can transmit torque to at least one wheel which forms part of the first carriage and moves along the aforementioned tracks. A second prime mover can be provided for driving the second carriage with respect to the first carriage.

A platform or ramp is preferably installed in front of or behind the threshold structure to support one or more wheels of a second set of aligned wheels while the wheel or wheels of the first mentioned set of wheels rest in the socket or sockets of the second carriage.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
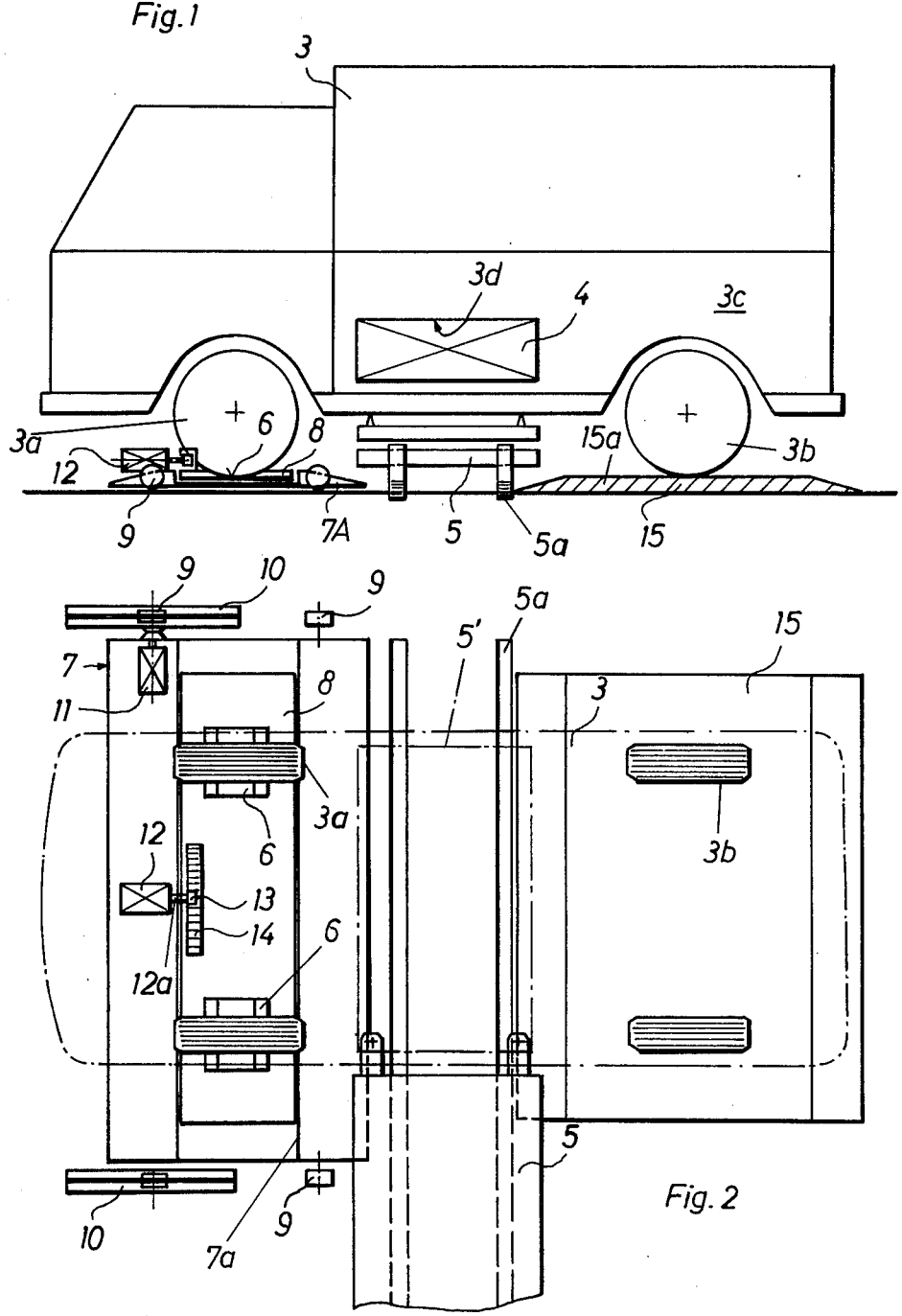
FIG. 1 is a schematic partly side elevational and partly longitudinal vertical sectional view of an apparatus which embodies the invention, further showing a battery-operated road vehicle in a position of readiness for removal of a spent battery or insertion of a fresh battery.
FIG. 2 is a plan view of the apparatus, with the outline of the vehicle indicated by phantom lines.

The drawing shows a road vehicle 3 (e.g., a truck) having a set of front wheels 3a, a set of rear wheels 3b, a frame or chassis 3c and a compartment 3d provided in the chassis 3c and serving to receive a motive-power battery 4. The vehicle 3 is located at a relay station and is shown in an optimum position with respect to a conveyance 5, e.g., a wheel-mounted dolly which is movable along rails 5a extending at right angles to the longitudinal direction of the properly positioned vehicle. The illustrated dolly 5 is sufficiently low to be movable to the phantomline position 5' (see FIG. 2) in which it is located below the chassis 3c to receive a battery which is accessible at the underside of the chassis. If the compartment 3d is accessible at one side of the chassis 3c, the dolly 5 will be moved to the solidline position of FIG. 2 or replaced with a dolly whose frame extends to the level of the lowermost part of the illustrated compartment 3d.

The apparatus comprises a threshold structure which is sufficiently low to be traversed by the vehicle 3 regardless of whether the vehicle is driven forwardly or backwards. The threshold structure comprises a first carriage 7 having wheels 9 at least one of which can be driven clockwise or counterclockwise by a motor 11, e.g., a reversible electric or fluid-operated motor. At least the front wheels 9 are mounted on tracks 10 which extend in parallelism with the longitudinal direction of the vehicle 3, i.e., at right angles to the rails 5a for the wheels of the dolly 5.

The first carriage 7 has a transversely extending channel or recess 7a bounded by guide surfaces which confine a second carriage or slide 8 to movement back and forth at right angles to the direction of movement of the carriage 7 along the tracks 10. The slide 8 has a composite socket including two discrete sockets 6 each of which can receive one of the front wheels 3a or one of the rear wheels 3b. The wheels 3b will rest in the sockets 6 if the vehicle is driven into the relay station in a direction from the left to the right, as viewed in FIG. 1. The vehicle will be driven in such direction if the compartment 3d is provided in the other side of the chassis 3c (i.e., in the upper side, as viewed in FIG. 2). In order to introduce the lowermost portions of the wheels 3a or 3b into the respective sockets 6, the operator or an attendant at the relay station must drive the vehicle 3 in the general direction of movement of the carriage 7 along the tracks 10. The width of the sockets 6 exceeds the width of the wheels 3a or 3b, and the operator need not drive the vehicle to a position in which the wheels 3a or 3b are located exactly centrally of the respective recesses. Any misalignment of the vehicle 3 with respect to the dolly 5 is corrected by moving the carriage 7 along the tracks 10 and/or by moving the slide 8 lengthwise of the channel 7a. The apparatus preferably comprises means for driving the slide 8 in the channel 7a; such means includes a reversible electric or fluid-operated motor 12 mounted in or on the carriage 7 and having an output shaft 12a which carries a pinion 13 in mesh with a toothed rack 14 on the slide 8.

In order to reduce the energy requirements of the motor 12, the surfaces bounding the channel 7a are preferably lined with a friction-reducing substance, such as Teflon (trademark). Alternatively, or in addition to such lining, the carriage 7 and/or the slide 8 can be provided with roller bearings, antifriction bearings, Teflon-coated runners or other suitable friction reducing devices. In fact, friction between the carriage 7 and slide 8 can be reduced to such an extent that the motor 12 can be omitted or need not be started when one or more attendants decide to push or pull the slide 8 lengthwise of the channel 7a.

The apparatus further comprises a horizontal platform or ramp 15 which is spaced apart from the threshold structure and serves to support the rear wheels 3b when the front wheels 3a rest in the sockets 6, or vice versa. The level of the upper surface 15a of the platform 15 with respect to the top faces of tracks 10 for the carriage 7 is selected in such a way that the compartment 3d is located at an optimum level with respect to the dolly 5. At any rate, the illustrated positioning of the vehicle 3 insures that an imaginary plane which contacts the lowermost points of wheels 3a, 3b is the same for each and every vehicle which enters the relay station.

The motor 11 will be started forwardly or in reverse to move the vehicle to an optimum position as considered in the longitudinal direction of the tracks 10. The motor 12 will be started to drive the pinion 13 clockwise or counterclockwise in order to change the orientation of the vehicle 3 with respect to a vertical axis. The platform 15 is long and wide enough to insure that the wheels 3b remain on its surface 15a irrespective of the extent to which the vehicle 3 must be moved forwardly or backwards and/or its front part moved sideways, as long as the operator is capable of causing the wheels 3a to enter the respective sockets 6.

If desired, the apparatus can be equipped with a system of detectors (not shown) which monitor the position of the vehicle as soon as the wheels 3a or 3b enter and come to rest in the sockets 6 and which thereupon transmit appropriate signals to the controls for the motors 11 and 12 in order to effect a fully automatic adjustment of the vehicle to an optimum position with respect to the dolly 5. However, even in the absence of such detectors, the adjustment of a vehicle to an optimum position can be completed within a surprisingly short interval of time which is only a fraction of the time spent by an operator (even a highly skilled driver) to move the vehicle to such optimum position under its own power.

While driving the vehicle 3 toward the position shown in FIGS. 1 and 2, the operator senses that the front wheels encounter and move onto the ramp-like portion 7A of the carriage 7. This alerts the driver to apply the brakes in order to insure that the vehicle 3 comes to a halt as soon as the wheels 3a begin to descend toward and into the respective sockets 6 of the slide 8. The vehicle can be driven onto the platform 15 and slide 8 in each and every position of the carriage 7 relative to the tracks 10 and/or in practically each and every position of the slide 8 relative to the carriage 7. Any deviations of the position of vehicle 3 from an optimum position are eliminated by starting the motor 11 and/or 12. The length of tracks 10 and the extent of movement of slide 8 relative to the carriage 7 are selected in such a way that the illustrated apparatus can be used for positioning of all or nearly all types of battery-operated road vehicles. A skilled attendant at the relay station will immediately recognize the type of an arriving battery-operated vehicle and will move the carriage 7 and the slide 8 to or near to the optimum position so that the vehicle is in or close to the proper position relative to the dolly 5 as soon as its wheels 3a or 3b enter the respective sockets 6. This contributes to additional reduction of time which is needed to properly position a vehicle for convenient replacement of one or more exhausted batteries with one or more recharged batteries.

It is further within the purview of the invention to provide a pit in the floor or ground between the platform 15 and the threshold structure. Such pit can be entered into to enable an attendant to lower a spent battery stored in a compartment which is accessible from the underside of the chassis and to introduce a recharged battery, either by hand or by resorting to suitable auxiliary equipment such as a vertically movable platform.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for positioning battery operated road vehicles which have battery compartments at battery replacement stations wherein fresh batteries are moved toward or spent batteries are moved away from the compartments of vehicles along a predetermined path, comprising a threshold structure which can be traversed by the wheels of a vehicle and includes a ground-contacting first carriage movable back and forth in a first direction, and a second carriage movable in said first carriage back and forth in a second direction substantially at right angles to said first direction, said second carriage being adapted to support the wheels of a single set of aligned wheels on a vehicle which is driven onto said structure in the general direction of movement of said first carriage and said second carriage having socket means arranged to receive at least one wheel of said single set of aligned wheels, the movement of said first carriage resulting in movement of the vehicle in said first direction and the movement of said second carriage resulting in a change of orientation of the vehicle about a substantially vertical axis while said set of aligned wheels is supported by said second carriage when the movement of at least one of said carriages is necessary to move the compartment of the vehicle at said station to an optimum position with respect to said path; and means for driving said second carriage in said second direction.

2. Apparatus as defined in claim 1, further comprising tracks for guiding said first carriage during movement in said first direction.

3. Apparatus as defined in claim 1, wherein said first carriage comprises guide means for confining said second carriage to movement in said second direction.

4. Apparatus as defined in claim 1, wherein said second carriage is recessed into said first carriage.

5. Apparatus as defined in claim 1, further comprising means for driving said first carriage in said first direction.

6. Apparatus as defined in claim 5, wherein said first carriage comprises wheels and said means for driving said first carriage comprises motor means arranged to transmit torque to at least one of said last mentioned wheels.

7. Apparatus as defined in claim 1, further comprising a platform arranged to support at least one wheel of a second set of aligned wheels on a vehicle whose first mentioned one wheel rests in said socket means.

8. Apparatus as defined in claim 1, further comprising a conveyance movable in substantial parallelism with said second carriage toward and away from one side of a vehicle whose one wheel rests in said socket means.

9. Apparatus as defined in claim 1, wherein said socket means has several portions which can receive different wheels of said set of aligned wheels.

* * * * *